May 27, 1958 S. N. SMALL Re. 24,477

BEACH AND GARDEN UMBRELLA AND MECHANISM FOR OPENING AND CLOSING SAME

Original Filed March 14, 1955 2 Sheets-Sheet 1

INVENTOR.
SAMUEL N. SMALL
BY Percy Freeman
ATTORNEY

BEACH AND GARDEN UMBRELLA AND MECHANISM FOR OPENING AND CLOSING SAME

Original Filed March 14, 1955 2 Sheets-Sheet 2

INVENTOR.
SAMUEL N. SMALL
BY
Percy Freeman
ATTORNEY

United States Patent Office

Re. 24,477
Reissued May 27, 1958

24,477

BEACH AND GARDEN UMBRELLA AND MECHANISM FOR OPENING AND CLOSING SAME

Samuel N. Small, Valley Stream, N. Y., assignor to Alfred G. Cohen and Paul Weiss, both of Flushing, N. Y.

Original No. 2,782,795, dated February 26, 1957, Serial No. 494,084, March 14, 1955. Application for reissue May 27, 1957, Serial No. 663,569

11 Claims. (Cl. 135—20)

Matter enclosed in heavy brackets [ ] appears in the original patent but forms no part of this reissue specification; matter printed in italics indicates the additions made by reissue.

This invention relates generally to collapsible or foldable umbrellas, and is particularly concerned with the operating mechanism of relatively large umbrellas of the beach and garden type.

The particular embodiment of the present invention, which is illustrated in the drawings and which will be described hereinafter in greater detail, comprises generally an umbrella post, a runner slidable on the post for operating the umbrella canopy, and a latch mounted in the umbrella post, the latch being set by extreme upward runner movement to hold the runner in its operative position, and being released by slight upward movement of the runner from its operative position to permit movement of the latter downwards to its inoperative position.

As is well known to those versed in the art, relatively large umbrellas of the conventional beach, garden and lawn type are extremely difficult to operate due to their great weight, the force required to spread the canopy, and the usually inconvenient location of the runner stop, near the upper end of the post or stick. While umbrellas have been provided with operating devices employing mechanically advantageous mechanisms to reduce the required physical operating force, such devices have been subject to serious disadvantages. One defect common to the prior art devices was that of complex and expensive construction readily subject to malfunctioning and not easily repaired. Another failing of the previous umbrella-operating devices was the necessity for tedious and often skillful operating procedures, frequently consuming considerable time and requiring extraordinary dexterity.

Accordingly, it is a general object of the present invention to provide an umbrella operating device of the type described which overcomes the above-mentioned difficulties, and which may be quickly and efficiently opened and closed by a single manual movement, namely the pulling of a cord. Further, the angle at which the cord is pulled is not critical, it being only necessary to pull the cord at any convenient angle to raise or open the umbrella, and again pull the cord at any convenient angle to lower or close the umbrella. In its preferred form, the cord is pulled generally downwards to permit the simple application of the operator's weight.

It is a further object of the present invention to provide an umbrella operating mechanism having the advantageous characteristics mentioned in the foregoing paragraph, and which is simple and durable in construction, requiring a minimum of sturdy parts, which is reliable in operation, and can be manufactured and sold *at* a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
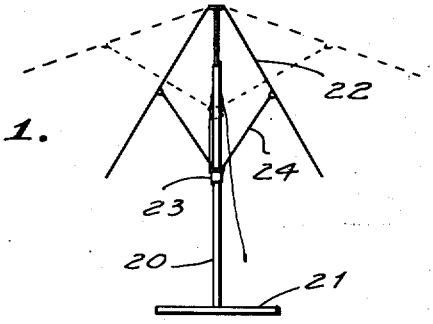
Fig. 1 is a schematic elevational view showing an umbrella employing the operating device of the present invention.

Referring now more particularly to the drawings, and specifically to Fig. 1 thereof, the embodiment of the invention illustrated therein comprises an upstanding post or supporting standard 20 which may be supported on or imbedded in any suitable base 21. Pivoted to the upper end of the post 20 are a plurality of radially extending ribs 22 adapted to support a flexible sheet covering or awning (omitted from the drawings for clarity of understanding) and combining with the latter to define a canopy. An annular collar or runner 23 is slidably circomposed about the post 20 for vertical movement therealong, and is operatively connected to the spokes or ribs 22 by a plurality of struts 24, each pivoted to the runner 23 and one of the ribs. As in conventional umbrella construction, upward movement of the runner 23 serves to open or extend the umbrella canopy, and downward runner movement effects closure or collapse of the canopy.

Figures 2, 3, 4, 5:
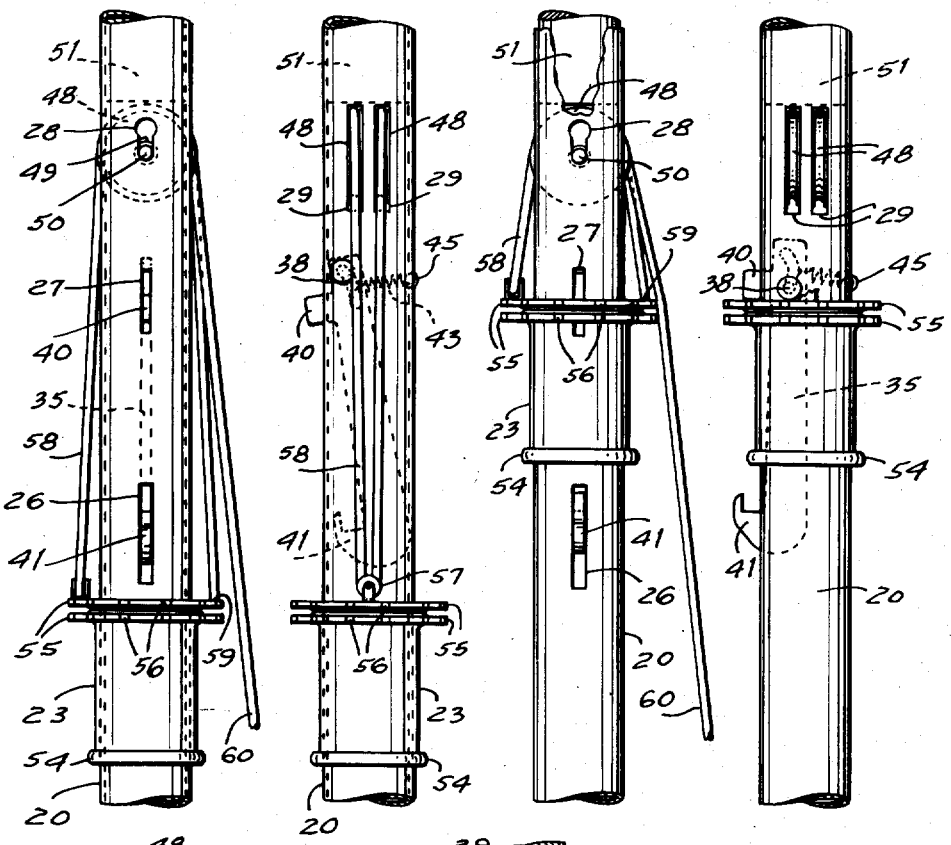
Fig. 2 is a partial elevational view, greatly enlarged, showing a portion of the umbrella post incorporating the construction of the present invention, and illustrating a closed or collapsed position of the umbrella.
Fig. 3 is a partial elevational view similar to Fig. 2 and showing the elements of the device in the same operative condition, but taken at right angles to Fig. 2.
Fig. 4 is a partial elevational view similar to Fig. 2, but showing the mechanism during opening of the umbrella.
Fig. 5 is a view similar to Fig. 4, showing the same condition of operation, but taken at right angles to the latter.

As seen in Figs. 2 and 3, the post 20 is preferably hollow, at least in part, and in the illustrated embodiment is of circular cross-sectional configuration. Formed in the hollow post 20 are a pair of spaced, vertically or longitudinally aligned slots 26 and 27 which each communicate between the interior and exterior of the post. The lower slot 26 is preferably of greater length than the upper slot 27. The post 20 is further formed with a pair of diametrically opposed keyhole shaped slots 28, 28, one of which is preferably in vertical alignment with the slots 26 and 27 and spaced above the upper slot 27. Also formed in the post 20 are four vertically or longitudinally disposed slots designated 29 and arranged in two opposed pairs on opposite sides of the post, each pair being disposed medially between the opposed keyhole slots 28, 28. An access opening 31 is formed in the post 20 generally opposite to the vertically elongated slot 27; and a relatively small anchoring hole 32 is formed in the post immediately below the access opening.

Figure 13:
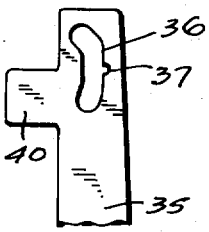
Fig. 13 is a partial plan view showing the latch piece of the device, removed therefrom.

An elongated latch piece or catch, generally designated 35, is disposed longitudinally of and within the post 20 adjacent to the vertically spaced slots 26 and 27. The upper end portion of the latch piece 35 is formed with a somewhat arcuate slot 36, being concave toward the slot 27 and convex toward the access opening 31. The configuration of the slot 36 is best seen in Fig. 13, where it is evident that the slot is formed with an internal notch 37 in its outer or concave edge. A pivot pin 38 extends chordally across the post 20, through the slot 36 and has its opposite ends fixedly secured to the post on opposite sides of and adjacent to the slot 27. Thus, the pivot pin 38 extends transversely of the post, is spaced between the slot 27 and opening 31, and mounts the latch piece 35 for vertical shifting movement of the latter as limited by the slot 36, and rotation of the latch piece about the pin at any position of the vertical shifting movement, as will appear more fully hereinafter.

Projecting transversely from the elongated latch piece 35, adjacent to the upper end of the latter, is a lug or abutment 40. That is, the abutment 40 projects from the latch piece 35 in the region of the slot 36 loosely through and out of the slot 27. On the lower end of the latch piece 35, projecting transversely therefrom, is an upwardly opening hook or holding member 41 disposed in the region of the slot 26. As will be observed from Figs. 3 and 5, the abutment 40 at all times projects exteriorly of the post 20 during rotation of the latch piece 35, while the hook or holding member 41 swings between a retracted position entirely within the post (Fig. 3) and an extended position (Fig. 5) projecting exteriorly of the post through the slot 26 upon rotation of the latch piece.

A coil tension spring 43 or other suitable resilient means is connected between the slotted portion of the latch piece 35 and the post 20 opposite the slot 27. More specifically, the spring 43 has its opposite ends looped or hooked, as at 44 and 45, the former being engaged in the notch 37 and the latter extending exteriorly through the access opening 31 and anchored in the hole 32.

Also disposed within the post 20 are a pair of axially aligned spaced pulleys or sheaves 48, 48, each of which projects slightly through an opposed pair of slots 29. A pin 49 extends axially through the pulleys 48, 48 and has reduced end portions 50, 50 seated in the reduced, lower end portions of the keyhole slots 28, 28 to rotatably mount the sheaves in the post. Obviously, assembly of the sheaves 48 and pin 49 is facilitated by the keyhole slots 28, whereby the pin may be inserted through the upper enlarged portions of the keyhole slots and permanently retained against axial shifting by the lower keyhole slot portions. A plug 51, or other suitable means, may be inserted in the post 20 above the sheaves 48 to prevent upward movement of the latter, and hence withdrawal of the pin 49 from the keyhole slots.

Slidably circumposed about the post 20, below the abutment or lug 40, is the tubular collar or runner 23. The lower end of the runner 23 may be circumferentially beaded, or otherwise reinforced, as at 54, if desired. Projecting radially outwards from the runner 23 at its upper end are a pair of vertically spaced, circumferentially extending flanges 55, 55. Obviously, the upper end of the runner 23, and the upper flange 55 will be movable into engagement with the abutment 40 upon upward movement of the runner. The flanges 55, 55 are provided with a plurality of circumferentially spaced, radial notches 56 for rotatably receiving the lower ends of the struts 24.

An upstanding pulley or sheave 57 is mounted on the upper flange 55 for rotation about an axis disposed radially of the post 20; and, an operating cord or line 58 has one end secured to the runner 53, as at 59, opposite the sheave 57, extends thence upwards and over one of the sheaves 48, downwards under the sheave 57, upwards and over the other sheave 48, and downwards terminating in a free actuating end 60.

In operation, Figs. 2 and 3 representing a collapsed or partially collapsed umbrella condition, a downward force is exerted on the free end 60 of the line 58. This effects upward movement of the runner 23, at considerable mechanical advantage, namely 3 to 1 in the illustrated embodiment, into engagement with the abutment 40. In Figs. 2 and 3, it will be seen that the latch piece 35 is in retracted position with the hook 41, within the confines of the hollow post 20, which condition will be more fully described hereinafter.

Upon engagement of the upper end of the runner 23 with the abutment member 40, the latch piece is simultaneously shifted longitudinally upwards and rotated to extend the holding member 41 exteriorly of the post 20. That is, engagement with the transversely extending abutment 40 tends to effect rotation of the latch piece 36 about the pin 38, and the slot 36 permits upward shifting of the latch piece relative to the pivot pin. In addition to the action of the runner 23 against the abutment 40 to rotate the latch piece, it will be observed in Fig. 5 that upward shifting of the latch piece serves to elevate the notch 37 and hence the spring end 44 above the pin 38 so that the spring also exerts a rotating force on the latch piece in the clockwise direction to extend the holding member 41.

Figure 6:
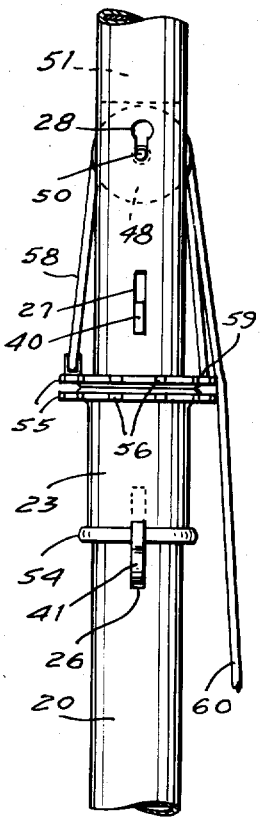
Fig. 6 is a partial elevational view similar to Fig. 2, showing the elements of the device when the umbrella has been opened.
Figure 7:
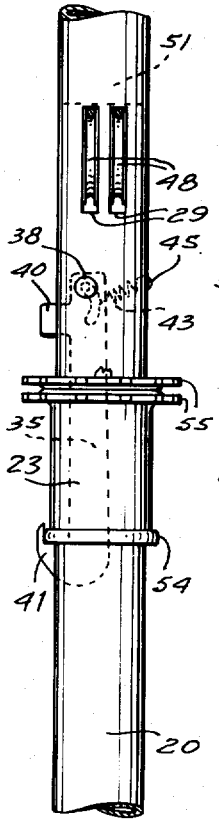
Fig. 7 is a view similar to Fig. 6 but taken at right angles thereto.

Hence, upon slight downward movement of the runner 23 away from its position of Fig. 5, the latch piece will be maintained in its hook-extending position by the spring 43, so that the lower end bead 54 of the runner will be received in the exteriorly projecting upwardly facing hook. Further, the weight of the runner and canopy will exert a force on the hook 41 so as to shift the latch piece 35 downwards to a position limited by the upper end of the slot 36, which position is illustrated in Figs. 6 and 7. As illustrated therein, the spring end 44 has been shifted to a point below the pivot pin 38, so that the spring tension urges the latch piece 35 in the counterclockwise direction tending to retract the hook 41. However, the runner 23 being engaged in the hook 41 serves to maintain the latter exteriorly of the post 20 against the spring force. This is the operative umbrella position with the runner 23 supported in an elevated condition to maintain the umbrella canopy extended.

Figure 8:
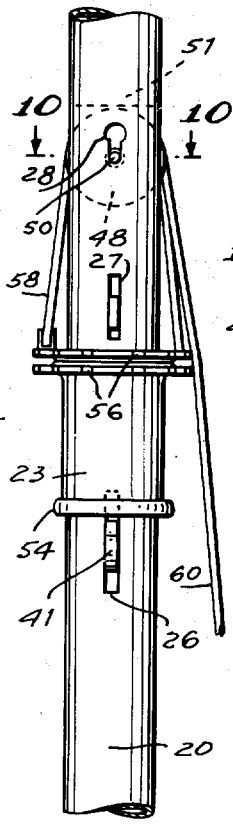
Fig. 8 is a view similar to Fig. 6 but showing the device during closing or collapse of the umbrella.
Figure 9:
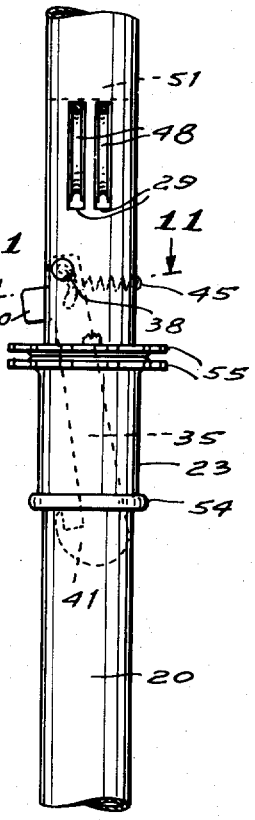
Fig. 9 is a view similar to Fig. 8 but taken at right angles thereto.
Figure 10:
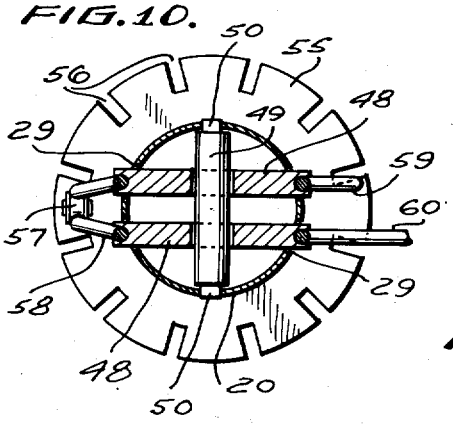
Fig. 10 is a horizontal sectional view taken substantially along the line 10—10 of Fig. 8.
Figure 11:
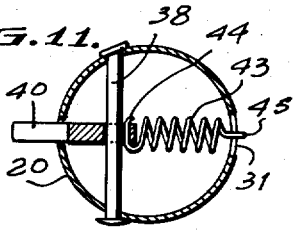
Fig. 11 is a horizontal sectional view taken substantially along the line 11—11 of Fig. 9.
Figure 12:
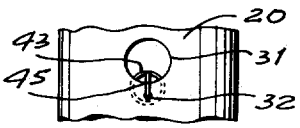
Fig. 12 is a fragmentary view taken from the right-hand side of Fig. 9.

In order to collapse the umbrella, it is only necessary to raise the runner 23 slightly, just sufficient to withdraw the latter from the hook 41, and release the runner. More specifically, a pull on the free line end 60 to withdraw the runner from the hook 41 without engaging the abutment 40 will permit the spring 45 to retract the hook 41 to its position completely within the post 20. This position is illustrated in Figs. 8 and 9. Mere release of the cord 58 will then permit the runner 23 to slide downwards beyond the hook 24 under the weight of the canopy. Hence, it will be understood that a mere pull on the cord 58 sufficient to move the runner 23 upwards against the abutment 40, and release of the cord, will effect erection of the umbrella, while a slight pull on the cord just sufficient to withdraw the runner from the hook 41, and subsequent release of the cord, will effect collapse or closure of the umbrella. The shape of the ends of slot 36, as best seen in Fig. 13, is such as to facilitate the retention of the latch member in its complete retracted condition of Fig. 3 and in its projected position of Fig. 5.

Figure 14:
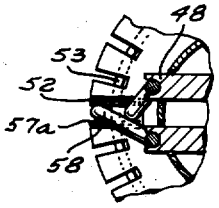
Fig. 14 is a fragmentary view partly in cross section, similar to Fig. 10 but showing a modification thereof.
Figure 14A:
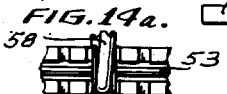
Fig. 14a is a fragmentary elevational view of the modification shown in Fig. 14.

In Figs. 14 and 14a there is shown a modification of the sheave mounting on the runner. In this form of the invention, the sheave or pulley 57a is mounted in a slot 52 extending radially inwardly of the runner flanges 55 and the sheave 57a is mounted to rotate in a plane radially of the runner flanges, the wire 53 to which the struts or spreaders 24 are pivoted, also serving as the axle on which the sheave 57a rotates.

Figure 15:
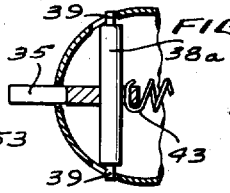
Fig. 15 is a partial sectional view similar to Fig. 11, but showing a modification thereof.

In Fig. 15 is shown a modified form of mounting for the latch piece 35. In this modification, the pivot pin 38a is provided with reduced ends 39, each of which seats against the side of its respective opening 42 which extends through the walls of post 20. It will be noted that the openings 42 are of large enough diameter to permit passage therethrough of the pivot pin 38a so the pin extends through the latch piece 35. The length of the enlarged portion of pivot pin 38*a* is such as to adapt it to rest chordally within the tube 20 with its shoulders bearing against the walls and being retained by the tension of spring 43. This arrangement makes for ease of assembly and eliminates the need for heading over the ends 39 of the pivot pin 38a.

From the foregoing, it is seen that the present invention provides an umbrella operating mechanism which fully accomplishes its intended objects, and which is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

Having thus described my invention, what I desire to secure by Letters Patent, is:

1. In an umbrella having a post and a collapsible canopy carried adjacent to the upper end of said post, the combination comprising a latch piece disposed longitudinally of and within said post and mounted therein for vertical shifting movement longitudinally of said post and rotative movement about an axis transverse of said post, spring means connected to said latch piece for resiliently urging the latter in one direction of rotation when said latch piece is shifted to an upper position and in the other direction of rotation when the latch piece is shifted to a lower position, an abutment projecting transversely from said latch piece, a runner operatively connected to said canopy and slidable up and down along said post below said abutment for respectively spreading and collapsing said canopy, said runner being slidable upwards against said abutment to shift said latch piece to its upper position to subject the latch piece to swinging movement in said one direction under the force of said spring means, and a support member on said latch piece spaced below said abutment and movable with said latch piece upon rotation of the latter in said one direction from a retracted position out of the path of said runner to an extended position disposed in said runner path, said runner being slidable partially downwards into engagement with said support member to shift said latch piece downwards and retain said supporting member in its extended position against the force of said spring means, slight upward movement of said runner out of engagement with said support member thus releasing the latter for retraction under the force of said spring means and for further downward movement of said runner.

2. The combination according to claim 1, wherein said abutment is disposed on one side of said axis so that upward movement of said runner against said abutment aids said spring means to rotate said latch piece in said one direction.

3. The combination according to claim 1, said runner comprising a collar slidably circumposed about said post, and said abutment projecting exteriorly of said post into the path of said runner.

4. The combination according to claim 1, said supporting member comprising an upwardly facing hook shaped to snugly receive said runner on said partial downward movement of the latter.

5. In a collapsible umbrella having a post and an operating runner slidable along said post, a latch piece disposed longitudinally of and within said post and formed with a generally longitudinally elongated slot, a pivot pin extending through said slot and fixed to said post to mount said latch piece for vertical shifting movement and rotation about said pin, spring means having one end connected to said post on one side of said pin and the other end connected to said latch piece adjacent to an intermediate portion of said slot so as to shift vertically with said latch piece above and below said pin, said spring means thus serving to resiliently urge said latch piece in opposite directions of rotation upon movement of the latter to its upper and lower positions, an abutment projecting from said latch piece transversely of said pin above said runner and into the path of the latter, said abutment being engaged by said runner upon upward movement of the latter to shift said latch piece upwards for swinging movement of the latter in one direction under the force of said spring, and a support member on said latch piece below said abutment and movable with said latch piece upon rotation of the latter in said one direction from a retracted position out of the path of said runner to an extended position disposed in said runner path, said runner being slidable partially downwards into engagement with said support member to shift said latch piece downwards and retain said support member in its extended position against the force of said spring means, slight upward movement of said runner out of engagement with said support member thus releasing the latter for retraction under the force of said spring means and for further downward movement of said runner.

6. A device according to claim 5, said spring means comprising a tension spring, and said abutment being disposed on the other side of said pin to aid said spring means in rotating said latch piece in said one direction.

7. A device according to claim 5, said runner comprising a collar slidably circumposed about said post, and said abutment projecting exteriorly of said post into the path of said collar.

8. A device according to claim 5, said support member comprising an upwardly facing hook shaped to snugly receive said runner on said partial downward movement of the latter.

9. In an umbrella of the type having a hollow post, a collapsible canopy, a flanged runner slidable on the post, and latching means for holding the runner in the uppermost position to retain the canopy in spread condition; means for raising and lowering the runner thus respectively to spread and collapse the canopy, said means comprising two pulleys rotatably spacedly mounted on said hollow post with a partition separating the pulleys to isolate the runs of the operating cords or lines, said pulleys having their peripheries extending through opposite sides of said post, a sheave pivotally mounted between the flanges on said runner with its axis extending chordally of the flanges of said runner and with its plane of rotation extending radially of said runner, a circumferential wire extending through an eye in the lower end of each spreader and through said sheave to serve as an axle therefor and a cord or line having one end secured to said runner at a point diametrically opposite said sheave and trained over one of said pulleys, thence over said sheave, and thence over the other of said pulleys to terminate in a free actuating or power end.

*10. In a collapsible umbrella having a collapsible canopy, a tubular post and a canopy opening runner slidable along said tubular post, an elongated latch piece movably mounted in the tubular post, said latch piece having, at end portions thereof, spaced runner engaging means, one means of said latch piece being actuated by the runner to automatically move the other means into runner engaging position in upward movement of the runner on the tubular post, to released runner then engaging said last named means to support the canopy in open position, and means actuating the latch piece upon disengagement of the runner with the second named means, in limited upward movement of the runner from its canopy supporting open position, to automatically move said disengaged second named means into inoperative position to free the runner for downward movement of the post in collapsing the canopy.*

*11. A structure according to claim 10, wherein the first named means comprises an abutment on the latch piece projecting through the post and at all times above the runner.*

References Cited in the file of this patent or the original patent

UNITED STATES PATENTS

| | | |
|---|---|---|
| 32,861 | Davis | July 23, 1861 |
| 34,717 | Hawse | Mar. 18, 1862 |
| 852,533 | Wicks | May 7, 1907 |
| 1,043,928 | Harris | Nov. 12, 1912 |
| 2,568,362 | Primavera | Sept. 18, 1951 |
| 2,745,421 | Russell | May 15, 1956 |